United States Patent
Zoelfl et al.

(10) Patent No.: US 10,936,977 B2
(45) Date of Patent: Mar. 2, 2021

(54) METHOD FOR DETERMINING AN EFFICIENCY OF RESOURCES OF A PLANT FOR PRODUCING BEVERAGE CONTAINERS

(71) Applicant: KRONES AG, Neutraubling (DE)

(72) Inventors: Markus Zoelfl, Metten/ Berg (DE); Albert Link, Au i. d. H. (DE); Ulrich Buchhauser, Regensburg (DE); Norbert Ottmann, Regensburg (DE)

(73) Assignee: KRONES AG

( * ) Notice: Subject to any disclaimer, the term of this patent is extended or adjusted under 35 U.S.C. 154(b) by 503 days.

(21) Appl. No.: 14/653,204

(22) PCT Filed: Dec. 17, 2013

(86) PCT No.: PCT/EP2013/076998
§ 371 (c)(1),
(2) Date: Jun. 17, 2015

(87) PCT Pub. No.: WO2014/095938
PCT Pub. Date: Jun. 26, 2014

(65) Prior Publication Data
US 2015/0332190 A1  Nov. 19, 2015

(30) Foreign Application Priority Data

Dec. 17, 2012  (DE) .................... 10 2012 112 369.1

(51) Int. Cl.
*G06Q 10/06* (2012.01)
*G05B 15/02* (2006.01)
*G06Q 50/04* (2012.01)

(52) U.S. Cl.
CPC ....... *G06Q 10/06313* (2013.01); *G05B 15/02* (2013.01); *G06Q 10/06* (2013.01);
(Continued)

(58) Field of Classification Search
CPC .......... G06Q 10/06313; G06Q 10/06; G06Q 10/0639; G06Q 10/06312; G06Q 50/04; G05B 15/02

See application file for complete search history.

(56) References Cited

U.S. PATENT DOCUMENTS 4,146,923 A * 3/1979 Borkan .................... H02J 3/14
                                                      307/52
4,459,663 A * 7/1984 Dye ...................... G06Q 10/06
                                                      700/100
(Continued)

FOREIGN PATENT DOCUMENTS

| DE | 19542017 | 5/1996 | .......... G05B 19/418 |
| WO | WO2010128520 | 11/2010 | |
| WO | WO2012073536 | 6/2012 | ............. G06Q 50/00 |

OTHER PUBLICATIONS

International Search Report and Written Opinion issued in application No. PCT/EP2013/076998, dated May 27, 2014 (12 pgs).
(Continued)

*Primary Examiner* — Matthew S Gart
*Assistant Examiner* — Stephen S Swartz
(74) *Attorney, Agent, or Firm* — Hayes Soloway P.C.

(57) ABSTRACT

A method of determining the resource efficiency of a plant for the production of drinks containers, wherein the plant has at least one resource-consuming part, wherein the part of the plant is operated at least for a time in a first operative state (B1) in which a product is produced and the part of the plant has a first resource consumption (V1) in this operative state (B1), and wherein the part of the plant is operated at least for a time in a second operative state (B2) and has a second resource consumption (V1) in this second operative state (B2), wherein at least one first resource consumption (V1) capable of being allocated to the first operative state (B1) and at least one second resource consumption (V2) capable
(Continued)

of being allocated to the second operative state (B2) determined and the resource consumption (V1, V2) is allocated to the operative states (B1, B2). According to the invention a value characteristic of the resource efficiency of the part of the plant is determined while taking into consideration the first resource consumption (V1) and the second resource consumption (V2).

15 Claims, 2 Drawing Sheets

(52) U.S. Cl.
CPC ......... *G06Q 10/0639* (2013.01); *G06Q 50/04* (2013.01); *G05B 2219/32021* (2013.01); *G05B 2219/39167* (2013.01); *Y02P 70/10* (2015.11); *Y02P 90/02* (2015.11); *Y02P 90/30* (2015.11); *Y02P 90/82* (2015.11)

(56) References Cited

U.S. PATENT DOCUMENTS

| | | | | |
|---|---|---|---|---|
| 4,802,094 A * | 1/1989 | Nakamura | ......... | G05B 19/4183 198/340 |
| 4,958,292 A * | 9/1990 | Kaneko | ............ | G05B 19/41865 700/106 |
| 5,119,318 A * | 6/1992 | Paradies | ................... | G06N 5/04 706/47 |
| 5,369,570 A * | 11/1994 | Parad | ..................... | G06Q 10/06 700/99 |
| 5,398,336 A * | 3/1995 | Tantry | ..................... | G06F 9/465 |
| 5,797,129 A * | 8/1998 | Rohan | ................... | G06Q 10/06 705/7.22 |
| 6,643,556 B1 * | 11/2003 | Morenz | ................. | G06Q 10/06 700/100 |
| 7,134,540 B1 * | 11/2006 | Marti Sala | ......... | B65G 47/1457 198/392 |
| 7,349,838 B2 * | 3/2008 | Summers | ............... | G06Q 10/10 434/107 |
| 7,702,435 B2 * | 4/2010 | Pereira | ................. | G05B 13/042 701/30.8 |
| 2002/0103559 A1 * | 8/2002 | Gartstein | ............... | G06Q 10/04 700/99 |
| 2003/0158615 A1 * | 8/2003 | Weber | .................... | B65G 37/02 700/96 |
| 2004/0030428 A1 * | 2/2004 | Crampton | ............. | G06Q 10/06 700/101 |
| 2004/0095237 A1 * | 5/2004 | Chen | ................... | H02J 13/0086 340/506 |
| 2004/0162705 A1 * | 8/2004 | Grieb | ................ | G05B 23/0291 702/185 |
| 2005/0151993 A1 * | 7/2005 | Gartstein | .............. | G06F 3/1204 358/1.15 |
| 2006/0191993 A1 * | 8/2006 | Markham | .............. | G06Q 10/00 235/376 |
| 2007/0106545 A1 * | 5/2007 | Jowers | ............ | G06Q 10/06312 705/7.22 |
| 2007/0129834 A1 * | 6/2007 | Howard | ................. | G06Q 10/04 700/103 |
| 2008/0077266 A1 * | 3/2008 | Thierauf | ................ | G06Q 10/04 700/99 |
| 2008/0172312 A1 * | 7/2008 | Synesiou | .............. | G06Q 10/00 705/34 |
| 2009/0254572 A1 * | 10/2009 | Redlich | .................. | G06Q 10/06 |
| 2009/0281677 A1 * | 11/2009 | Botich | .............. | G06Q 30/0283 700/295 |
| 2010/0082149 A1 * | 4/2010 | Till | ........................ | B67C 3/007 700/214 |
| 2010/0168930 A1 * | 7/2010 | Bischof | ............. | G05B 23/0243 700/291 |
| 2011/0145657 A1 * | 6/2011 | Bishop | ................ | G06F 11/3495 714/47.1 |
| 2011/0172838 A1 * | 7/2011 | Pai | ............................ | H02J 3/06 700/292 |
| 2012/0173444 A1 * | 7/2012 | Zik | ........................ | G06F 30/20 705/317 |
| 2012/0316694 A1 * | 12/2012 | Glas | .................... | G05B 19/042 700/295 |
| 2013/0134962 A1 * | 5/2013 | Kamel | ................... | G06Q 50/06 324/103 R |
| 2013/0282415 A1 * | 10/2013 | Saito | .................... | G05B 19/418 705/7.11 |
| 2015/0051749 A1 * | 2/2015 | Hancock | ................ | G06Q 50/06 700/295 |

OTHER PUBLICATIONS

German Search Report issued in application No. 10 2012 112 369.1, dated Apr. 23, 2013 (5 pgs).

* cited by examiner

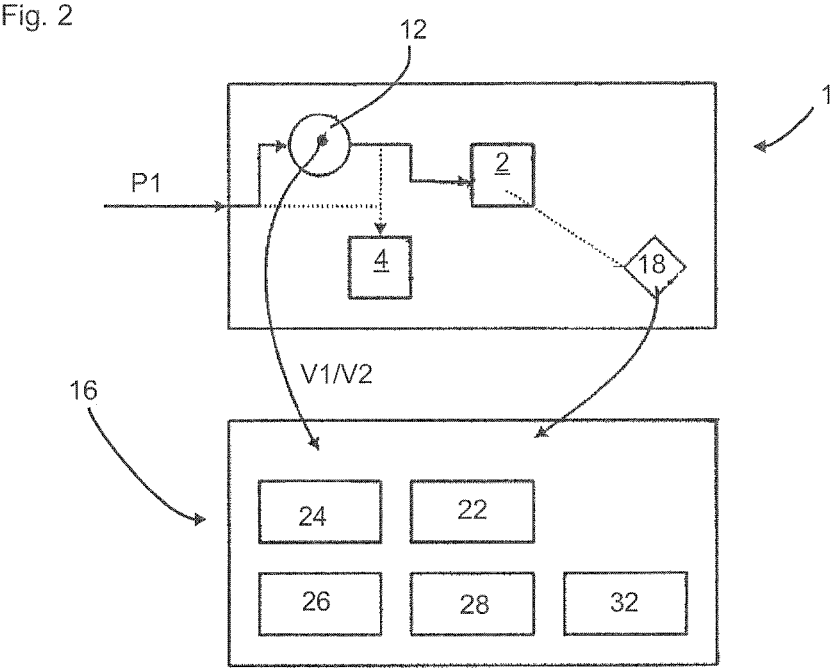

METHOD FOR DETERMINING AN EFFICIENCY OF RESOURCES OF A PLANT FOR PRODUCING BEVERAGE CONTAINERS

BACKGROUND OF THE INVENTION

The present invention relates to a method of determining the resource efficiency of a plant for the production of drinks containers as well as also to a corresponding plant for the production of drinks containers and/or packages. The containers described in the scope of this patent application can be different types of containers, such as for example plastic bottles, glass bottles, cans and also containers such as external packaging, cartons or the like and also for example palletizing. Various methods and apparatus are known from the prior art for the production of drinks containers. In this case widely varying method steps, such as for example the blow moulding of plastics material containers, the filling of the containers, the closing of the containers or even the application of labels to containers, are carried out during the production of drinks containers.

In addition, further method steps, such as for example heating procedures for plastics material pre-forms, sterilization procedures for bottle closures and the like, are necessary for the drinks containers.

In this case the individual parts of the plant of machines of this type for the production of drinks containers use resources in different ways, such as in particular energy, cleaning agents and the like. For the purposes of comparison it would be desirable to be able to illustrate, by means of an objective evaluation system, the resource efficiency of a plant of this type for the production of drinks containers.

In general, machines and also the parts of a plant described here have different operative states, such as for example a production state, a malfunction state, a deficiency state, a stoppage state and the like. Such states are capable of being detected in real time in this case and can also be defined in accordance with a pre-set standard, such as the so-called Weihenstephan Standard.

Systems of indicators, which define a degree of efficiency of a plant, such as for example DIN 8782 or even ABMI TC1, are also known from the prior art. By way of a system of indicators of this type, it is possible for states and the duration thereof to be ordered by a suitable classification, such as for example an overall working time of the machine, a production time, an operating time and a running time in which the product is actually produced. In this case it would be additionally possible for this real-time working efficiency of a plant of this type to be determined by that time in which the plant actually produces drinks containers being divided by those times in which the plant as a whole is operating, i.e. including planned machine down-times or those times which occur as a result of failure. Evaluation results of this type, however, are decisive only in part for the actual resource efficiency of a plant of this type.

SUMMARY OF THE INVENTION

The object of the invention in this case is to determine the resource efficiency of plants of this type for the production of drinks containers.

In the case of a method according to the invention to determine the resource efficiency of a plant for the production of drinks containers, the plant has at least one resource-consuming part, the part of the plant being operated at least for a time in a first operative state in which a product is produced and the part of the plant has a first resource consumption in this operative state. In addition, the part of the plant is operated at least for a time in a second operative state and has a second resource consumption in this second operative state. In this case at least one first resource consumption capable of being allocated to the first operative state and at least one second resource consumption capable of being allocated to the second operative state are determined and the respective resource consumption is allocated to the operative states.

According to the invention a value characteristic of each resource efficiency of the part of the plant is determined while taking into consideration the first resource consumption and the second resource consumption.

It is preferable in this case for values characteristic of this resource efficiency in each case to be determined if the resource is energy, a corresponding value, for example in kWh. It is preferable for the resource consumption and/or data or values (for example measurement values) respectively which are characteristic thereof to be stored at least for a time and/or at least in part in a memory device. In general at least one value (for example a measurement value) characteristic of at least one resource consumption is stored in a memory device. In this case it is possible for the respective resource consumptions (or (measurement) values characteristic thereof) to be measured and stored in a continuous manner.

In this way, it is preferable for a memory device to be provided which is designed in such a way that it stores the resource consumption (and/or (measurement) values which are characteristic of this resource consumption) which occurs in the individual operative states in each case. In this case it would be possible for these measurement values to be stored in the ongoing operation. In this way, the values could be stored in the memory device at pre-set intervals in each case. It is preferable, however, for the resource consumption of a plurality of parts of the plant or values characteristic thereof also to be stored. In addition, the resource consumption in different operative states of the respective part of the plant can also be stored, in particular also in a time dependency and/or in conjunction with information which allows the identification of the operative state.

A resource requirement or a resource consumption respectively need not necessarily be associated with the producing unit in this case. It is preferable, however, for the resource requirement to be capable of being allocated to a specific operative state of this unit. This applies, in particular, when taking plants with a plurality of subsidiary units (for example individual machines) into consideration.

In this case it is possible for the resource consumption to be determined by measurement, for example with measuring instruments. Another determination would also be possible, however, in particular by detection by a computer, by (statistical) simulation and, in general, statistical evaluations. In addition, a combination of a multiplicity of types of determination would be possible.

In particular, the resource consumption differs in the various operative states. The operative states in this case are advantageously selected from a group of operative states which have an operating time of the plant, a production time, which is formed from the working time minus the planned stoppage times, an overall time, which in turn is formed from the production time minus possible external malfunctions and an actual operating time in which production actually takes place and which in turn is formed from the production time mentioned above minus actual internal malfunctions of the plant.

It is pointed out, however, that an operative state need not necessarily coincide with the corresponding (secondary) times, or that an allocation to a specific time window is always possible respectively. In this way for example, the time windows for a planned and an unplanned stoppage of a part of the plant should differ, although they have the same resource consumption or the operative state in terms of the control does not change respectively. The resource requirement need not necessarily change when the operative states or times change.

It is advantageous in this case for operative states to be stand-alone and to have no subordinated states. It would also be possible, however, for the respective time windows to be further sub-divided in each case.

In this way, it is advantageous for a multiplicity of operative states to be taken into consideration, for example four operative states, which preferably differ in differing resource consumption in each case.

In the case of a further advantageous method the time periods of the individual operative states are also measured. It may also be sufficient, however, for only the absolute or the relative consumption of the respective resource to be determined.

It is advantageous for the resource consumption to be determined in an ongoing operation of the plant or the part of the plant respectively.

In the case of a further advantageous method the part of the plant is operated in more than two different operative states, as described above.

In the case of a further advantageous method the resource is selected from a plurality of resources which include energy, in particular electrical energy, heat, media for the treatment of the containers, (operating) costs, personnel costs and the like. In this way for example, an energy requirement or energy consumption respectively of the part of the plant can be determined, but another resource can also be investigated, such as for example the consumption of a sterilization agent for sterilizing the plant. In this case the operative state may also be that state in which the plant is sterilized and which can also possibly differ from the actual production state.

In particular, however, the resource to be determined is not the actual product or the constituents thereof respectively, for example containers, labels, closures and the like. A further possibility for the resource could also be for example compressed air, which is supplied to a blow moulding machine for shaping the plastics material pre-forms into the plastics material containers.

In general, it is therefore preferred for (operating) states to be combined and/or correlated. It is preferable, however, not for the time or for not only the time, or the period of time which is consumed for the added value respectively, to be compared with the overall time, but the consumption of resources or media respectively, which was required for the added value.

In the case of a further advantageous method the plant has a plurality of resource-consuming parts and a value characteristic of the resource efficiency of at least two parts of the plant is determined in each case for this respective part of the plant.

If, as mentioned above, the respective time periods of the operative states are determined, it is possible, at any individual time equivalent, for example over the corresponding average performance, for an absolute medium equivalent or resource consumption respectively to be determined. A system of indicators which describes a corresponding apparatus can be formed accordingly from these medium equivalents.

In this way, medium equivalents can be introduced instead of time equivalents.

In the case of a further preferred method a resource consumption capable of being allocated to at least one part of the plant is determined for this part of the plant.

In this way, an indicator can be introduced in particular for the measurement of the energy efficiency.

It is frequently possible, in particular in the case of complex machines, for not all the machines or parts of the plant respectively to be equipped with a complete resource or energy and medium measurement means respectively, since this would lead to considerable costs.

Within the scope of this preferred method it is therefore proposed that only some of the parts of the plant should be provided with measuring instruments of this type. These may be for example those parts of the plant which have a particularly high resource consumption or the resource consumptions of which differ to a pronounced degree in a manner dependent upon the respective operative states. The further consumption of the remaining parts of the plant can be determined (indirectly) for example by way of the overall consumption.

It is nevertheless possible, however, for all the machines involved in the value-adding process to be taken into consideration in the measurement. It is advantageous in this case for supporting processes to be considered separately, such as for example a CIP cleaning of the plant or the like.

It is preferable for the characteristic value—named above—for the resource efficiency to be an indicator which describes the resource efficiency, for example the energy efficiency of this system. This indicator can be formed in this case for each type of energy and also for each type of resource or each medium respectively. It is also possible for the individual medium equivalents mentioned above to be added. As a consequence of this, region and also factory indicators can be determined.

In the case of a further preferred method the mentioned medium equivalents or resource equivalents respectively are also converted, so that, as a result, indicators for example for the electrical energy, for the thermal energy or even resources such as water can also be deduced at factory level. In addition, it is possible for more than the indicators named to be deduced.

It is advantageous for the consumption of a specific resource to be included in the different (classified) production states, for example by the formation of totals or averages. As mentioned, the characteristic value for a specified resource can also be determined for a combination of a plurality of parts of the plant. In this case memory units which are used to record the respective resource consumption can also be allocated to each part of the plant in each case. In addition, the sum of the contents of these individual memory units or the individual resource consumption values respectively can also be added up by means of an accounting unit and can preferably also be stored.

In the case of a further method a ratio of a resource consumption for the actual production task to the overall resource consumption is calculated and preferably also stored. In this case the actual tasks of the respective parts of the plant can be the same or also different.

In the case of a further preferred method an overall resource efficiency characteristic of an entire plant is determined whilst taking into consideration the resource efficiency of at least two parts of the plant. It is preferable for an overall resource co-efficiency to be determined taking into consideration the resource co-efficiency of a plurality of parts of the plant.

In the case of a further advantageous method at least one part of the plant is selected from a group of parts of the plant, which includes blow moulding machines, sterilization devices, filling devices for filling containers, closure devices for closing containers, heating devices for heating plastics material pre-forms and the like.

In the case of a further advantageous method the value characteristic of the resource efficiency of the part of the plant is determined by at least one quotient formation. In this case, as mentioned above, the producing states in particular are compared with other states or all the states respectively.

The present invention further relates to an apparatus for the production of containers filled with liquids, which has a first resource-consuming part of the plant which is capable of being operated for a time in a first operative state and which is capable of being operated for a time in a second operative state, the first operative state and the second operative state differing at least with respect to the resource consumption and one operative state being a production state of the part of the plant.

According to the invention the apparatus has a detection device which determines the resource consumption of the part of the plant as well as an allocation device or classification device respectively, which allocates to the first operative state a first resource consumption characteristic of this operative state and which allocates to the second operative state a second resource consumption characteristic of this second operative state, as well as a processor device which determines a value characteristic of the resource efficiency of the part of the plant whilst taking into consideration the first resource consumption and the second resource consumption.

It is advantageous in this case for this first part of the plant to carry out a specified process step during the production of containers filled with liquids. It is advantageous for the apparatus to have at least two and in a particularly preferred manner a plurality of such parts of the plant, it being preferable for a resource efficiency to be determined for each individual one of these parts of the plant.

It is particularly preferred for the apparatus to have a second part of the plant which is capable of being operated for a time in a first operative state and which is capable of being operated for a time in a second operative state, the first operative state and the second operative state differing at least with respect to the resource consumption and one operative state being a production state of the part of the plant. It is advantageous, however, for the two parts of the plant to consume the same resource(s).

It is advantageous for the process device also to determine a value characteristic of the resource efficiency of the apparatus whilst taking into consideration the resource consumption of the two parts of the plant.

BRIEF DESCRIPTION OF THE DRAWINGS

Further advantages and embodiments are evident from the accompanying drawings. In the drawings

FIG. 2 is a diagrammatic illustration to explain the invention, and

FIG. 3 is an illustration to classify the individual resource consumptions.

DETAILED DESCRIPTION OF THE DRAWINGS

Figure 1:
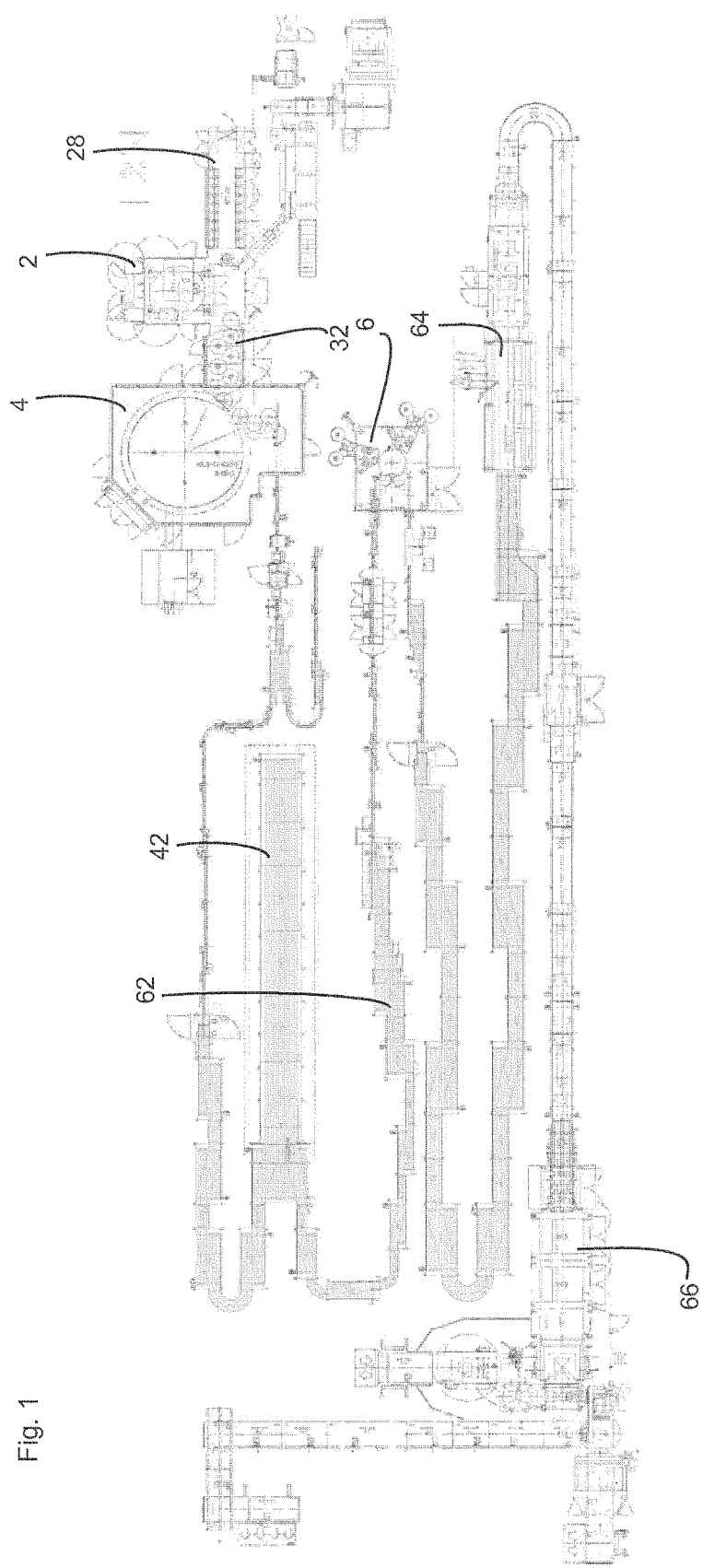
FIG. 1 is a diagrammatic illustration of a plant for the production of containers.

FIG. 1 is a diagrammatic illustration of a plant for the production of drinks containers. This plant has in this case a plurality of components for the processing of containers. In this way, a blow moulding machine, in particular a stretch blow moulding machine 2, is provided pre-forms into plastics material containers. After that, these containers are filled by means of a filling device 4. In addition, a cooling device 32 can be provided in this case, which cools the containers, for example by acting upon them with a liquid or with a gas. The reference number 28 designates a furnace, by means of which the plastics material pre-forms are heated to a temperature which allows a shaping. In addition, a sterilization device for the sterilization of the containers can also be provided.

After that, the finished plastics material containers are conveyed by way of conveying devices, in which case a buffer line 42 can also be provided. The reference number 62 likewise designates a conveying device. After that, the containers are labelled by means of a labelling device 6. The reference numbers 64 and 66 designate in a roughly diagrammatic manner packing devices, which for example can combine a plurality of containers to form groups of containers. Expressed more precisely, the reference number 64 designates a packing means and the reference number 66 a palletizing means or a layer formation device for a palletizing means respectively. In addition, further palletizing devices and the like can also be provided. With respect to each individual part of the plant, such as for example the blow moulding machine or the filling device 4, the respective resource efficiency can be determined, as set forth above. In addition, a super-ordinated determination of the resource efficiency is also possible.

It would also be possible for the resource efficiency of a part of a plant to be determined with respect to a plurality of resources, for example in the case of a blow moulding machine the resource efficiency with respect to the (electrical) energy and also with respect to the blow moulding air used. In addition, it would also be possible for parts of the plant to be classified into their resource-consuming subsidiary components and to determine the resource efficiency for at least one and preferably a plurality of these subsidiary components.

FIG. 2 is a diagrammatic illustration to explain a method according to the invention. In this case the reference number 1 refers to an apparatus for the production of drinks containers which here has two parts 2 and 4 of the plant illustrated diagrammatically. A specified resource (arrow P1) is supplied in this case to these parts of the plant. The reference number 12 designates a detection unit which detects the consumption of this resource by the first part 2 of the plant. In addition, the resource can also be supplied to the second part 4 of the plant, in which case it is possible, as mentioned above, for a consumption of the resource supplied to the part 2 of the plant likewise to be determined by the detection unit 12 or another detection unit, but it is also possible, as indicated by the dotted line, for the quantity of the resource supplied to the part 2 of the plant not to be determined directly.

The reference number 16 refers as a whole to a processor device which determines the resource efficiency in its entirety. In this case, as indicated by the arrow P2, the detected resource consumption V1 or V2 respectively in question is supplied in each case to the processor unit both in an operative state B1 and in an operative state B2. A determination unit 18 in this case can determine the quantity of the units produced, for example the quantity of containers produced. In addition, the processor unit 16 has a memory device 22 which stores the respective resource consumptions V1, V2 and in this case for example also stores them during the ongoing operation or in a continuous manner respectively. The reference number 24 designates a classification device or allocation device respectively, which allocates the individual operative states B1 and B2 respectively to the recorded consumers in each case, so that a storage relating to the operative states is possible. The resource consumption of the part of the plant is determined in various production states—in this case two—by means of accounting devices or calculating devices respectively 26, 28 which can also be arranged, however, in a common calculating unit.

A further accounting device 32 forms an overall resource consumption of the entire part of the plant on the basis of the resource consumption formed by the accounting units 26 and 28 and relating to the operative states.

The method has been specified in FIG. 2 with reference to individual devices or parts of the apparatus respectively in this case. It is pointed out that the same calculating unit, however, can also calculate in each case and the calculating units 26, 28, 32 illustrated here can represent individual method steps here in each case, which take place for the method according to the invention.

It would therefore also be possible for the parts 2, 4 of the plant to be combined if both parts of the plant fulfil a common task, for example the production of drinks containers; and also have uniform operative states in each case.

FIG. 3 is an illustration of the individual operative states or the time duration thereof respectively. In this case the operative state B1 designates that state in which production actually takes place. The operative state B2 or the time duration thereof respectively is formed from the time in which production actually takes place and, in addition, from a certain loss or a down-time L1 respectively, as may occur for example as a result of errors in the machine. The operative state B3 or the time duration thereof respectively additionally has a loss or a down-time L2 respectively, as may occur for example as a result of stoppage times caused extraneously. The operative state B4 or the time duration thereof respectively designates an overall production state, i.e. in this case a state in which the machine in part produces no products and in which all the down-times are factored in. In this case a down-time or a loss L3 respectively is still meant, as occur for example as a result of planned down-times.

If in the example shown by way of example a resource consumption or a consumption of electrical energy in the operative state B4, i.e. the overall production state, is at 100 KWh and a consumption of electrical energy in the operative state B1 in which production actually takes place is at 75 KWh, then this will result in a resource efficiency of 75%. In this case it would also be possible for these considerations to be made for a multiplicity of different resources. It is preferable for a consideration of the individual resources in terms of time to be omitted.

In addition, it is also possible for a plurality of parts of the plant to be combined, for example in a machine, a plant, a factory, a business concern or even a sector, even if the latter have different aims and even have different status, in which case at least one of these operative states will correspond to the respective aim of the sub-system. As indicated above, the entire resource efficiency is preferably determined by a quotient formation, and therefore corresponds to the portion of the resource used within the framework of its actual task, i.e. the value-adding task. It is pointed out that such a quotient can be formed directly from the individual operative states. It is also, however, possible or preferred respectively for the quotients to be formed from groups, for example groups of states and in particular from those groups which can be formed in accordance with a specific system, such as in particular but not exclusively an OEE (overall equipment effectiveness) system.

This OEE or overall plant effectiveness respectively is in this case an indicator or a measure respectively of the value addition of a plant and can be defined for example as the product of an availability factor, a performance factor and a quality factor.

Within the framework of a system as a whole, a plurality of production units or parts of the plant respectively can be present independently of one another or even interlinked with one another, for example can treat a specified product in a sequence, such as for example fill a container and then label it. In this case a calculating unit can carry out a calculation of the running time and also a calculation of the running time in the past on the basis of permanently recorded information for example. It is possible in this way for the memory device 22 mentioned above in one operative state to detect the respective operative states constantly and also to determine the respective resource consumption in a continuous manner. In this way, the resource efficiency can also be determined at a later point in time.

It is advantageous for a suitable plant also to have a display device in order to illustrate the respective indicators, such as in this case the resource efficiency. The detection unit 12, or the entire part 2 of the plant respectively, can preferably supply information relating to its operative and production states in the form of signals. It is advantageous in this case for an identification signal also to be emitted, which characterizes the part of the plant in question. The detection unit can be for example a measurement sensor or the like which determines the consumption of a medium or even an energy parameter. As well as electrical energy, however, it is also possible, as mentioned above, for any liquid, gaseous or solid substances which occur as consumption during the observation to be detected.

In this case it is possible for the signals which represent the information with respect to the operative or production states to be produced by a control means (for example by being derived from an internal signal), but it would also be possible for these signals to be detected by operator input, i.e. in particular within the scope of a manual detection by the operator, or for sensor information to be processed, for example of a bottle counter, a light barrier to determine a lack of containers or even an accounting unit. In addition, it is possible for these illustrated modes of procedure to be combined.

In the case of a further advantageous method the consumption in any desired time interval is illustrated and it is advantageous for the operative states to be allocated in the same time interval. Furthermore, as mentioned above, the consumption determined in each case is linked to the respective operative states or with them respectively.

In addition, it is advantageous for a consumption total for the duration of each operative state which occurs to be carried out during an observed time interval. Finally, it is advantageous to carry out a quotient formation over the consumption totals of the individual operative states or the operative states combined into the groups. It would be possible in this case for the method to be applied in a continuous manner, but also for it to be applied incrementally at each change of the operative state. As mentioned, the method can also be applied over a specified period of time whilst using data already stored. In this case it is possible for this period of time to be freely selected, for example a shift period, a specified day, a month, a year or the like.

In this way, the invention describes a technical method of determining a resource co-efficiency of production plants, and in particular of plants for the production of drinks containers. This method allows the user, by means of one or more indicators formed, to make statements on the qualitative and quantitative degree of utilization of the respective resource or production plant. As mentioned, information on production states and on a resource consumption is detected by way of one or more technical devices in this case, this is then converted if necessary, is linked together in a special manner, i.e. in particular classified, and is made available as an indicator. In this case it is possible for this indicator to be issued in a continuous manner or even to be made available with respect to production units.

As well as the resource efficiency shown here, it is also possible for further indicators to be determined, which is possible for the most part by simple mathematical operations. In this way, it is possible for a quality rate and a degree of efficiency or performance respectively to be additionally taken into consideration.

In addition, it would also be possible for a quality loss factor to be determined which results for example from energy loss portions on account of defects in quality. In this way for example, defectively produced drinks containers could also be taken into consideration. Furthermore, it is possible to determine a factor in terms of loss of performance, which results for example on account of energy loss portions on account of errors. In addition, it is also possible to determine a factor in terms of loss of availability, which results from energy loss portions on account of planned stoppage times or even for example on account of cleaning procedures.

In other words, the above-mentioned ratio between the actual working operation, in which containers are produced, and the overall production time can also be modified, so that another operative state, for example an operative state in which maintenance is carried out, is compared with the production time as a whole. In addition, indicators of this type can also be significant if it is necessary to determine, for example for plants for the production of drinks containers, how high the proportion of cleaning expenditure is, for example with reference to a specified resource such as energy. In addition, a relative resource requirement for cleaning agents for example can be checked during the entire running time of the plant. In this way, a statement is possible for example on which operative states have a particularly high requirement for cleaning agents.

With the aid of the present invention it is possible for example also to take into consideration threshold values of the current energy requirement, with reference to certain product parameters, such as time or output. In this case the resource efficiency advantageously consolidates the values with respect to the operative states and thus also permits an evaluation of a degree of energy efficiency over a certain period of time in an advantageous manner, without taking threshold values or violations of threshold values into consideration.

In particular, the invention also allows statements to be made concerning various operative states of the plant or a part of the plant.

The Applicants reserve the right to claim all the features disclosed in the application documents as being essential to the invention, insofar as they are novel either individually or in combination with respect to the prior art.

LIST OF REFERENCES 1 apparatus
2, 4 parts of the plant
6 labelling device
12 detection unit
16 processor device
18 determination unit
22 memory device
24 classification device
26, 28, 32 accounting devices/furnace
32 cooling device
64, 66 packaging devices
P1 resource supply
B1, B2, B3, B4 operative state of a part of the plant
B4 overall production state
V1, V2 resource consumption
L1-L3 down-times

The invention claimed is:

1. A method of determining the resource efficiency of a plant for the production of drink containers, the method comprising:

providing wherein the plant has at least one resource-consuming part comprising at least one of: blow moulding machines, sterilization devices, filling devices for filling containers, closure devices for closing containers, and heating devices for heating plastics material pre-forms, wherein the at least one resource-consuming part of the plant is operated at least for a time in a first operative state (B1) in which a product is produced and the at least one resource-consuming part of the plant has a first resource consumption (V1) in said first operative state (B1), and wherein the at least one resource-consuming part of the plant is operated at least for a time in a second operative state (B2) and has a second resource consumption (V2) in said second operative state (B2), wherein said first and second operative states (B1, B2) are selected from a group of operative states which have an operating time of the plant, a production time, which is formed from the working time minus the planned stoppage times, an overall time, which in turn is formed from the production time minus possible external malfunctions and an actual operating time in which production actually takes place and which in turn is formed from the production time minus actual internal malfunctions of the plant;

detecting with a detection device at least one first resource consumption (V1) capable of being allocated to said first operative state (B1) and at least one second resource consumption (V2) capable of being allocated to said second operative state (B2); and allocating said first and second resource consumptions (V1, V2) to said first and second operative states (B1, B2) with an allocation device in communication with a computerized processor, wherein at least one value characteristic of at least one resource consumption is stored in a non-transitory memory device, wherein a value characteristic of the resource efficiency of the part of the plant is determined while taking into consideration said first resource consumption (V1) and said second resource consumption (V2) and wherein the value characteristic of the resource efficiency of the part of the plant is determined by at least one quotient formation, according to the following time allocation formula:

$$B2=B1+L$$

wherein B1 and B2 are as represented above, and L represents a downtime, wherein the resource is selected from a plurality of actual resources selected from the group consisting of electrical energy, heat, media for the treatment of the containers, compressed air, operating costs, and personnel costs, wherein the resource to be determined is not the actual product nor the constituents thereof, wherein the storage of the measurement values and the determination of the resource consumption is carried out in an ongoing operation of the plant or the part of the plant, and wherein using one or more indicators formed, statements are made on the qualitative and quantitative degree of utilization of the respective resource or production plant, and the resource consumption is determined by measurements with measuring instruments and only parts of the plant are provided with measuring instruments which have a particularly high resource consumption or the resource consumption which differs to a pronounced degree in a manner dependent upon the respective operative states and the consumption of the remaining parts of the plant can be determined by way of the overall consumption, wherein all the particular parts of the plant involved in the value-adding process are taken into consideration in the measurement, and wherein the characteristic value for the resource efficiency is an indicator which describes the resource efficiency, including the energy efficiency of this system, wherein this indicator is formed for each type of energy and for each type of resource or each medium respectively; and wherein the plant includes a blow moulding machine, and the resource efficiency is determined with respect to the electrical energy and blow moulding air used.

2. The method according to claim 1, wherein a part of the plant is operated in more than two different operative states (B1, B2, B3, B4).

3. The method according to claim 1, wherein the plant has a plurality of resource-consuming parts and a value characteristic of the resource efficiency of at least two parts of the plant is determined in each case for this respective part of the plant.

4. The method according to claim 3, wherein a resource consumption capable of being allocated to at least one part of the plant is determined for this part of the plant.

5. The method according to claim 1, wherein an overall resource efficiency characteristic of a plant is determined whilst taking into consideration a resource efficiency of at least two parts of the plant.

6. A plant for the production of containers filled with liquids, said plant comprising:

a first resource-consuming part of the plant comprising at least one of: blow moulding machines, sterilization devices, filling devices for filling containers, closure devices for closing containers, and heating devices for heating plastics material pre-forms, the first resource-consuming part capable of being operated for a time in a first operative state (B1) and capable of being operated for a time in a second operative state (B2), wherein said first operative state (B1) and said second operative state (B2) differ at least with respect to a resource consumption of the first resource-consuming part and wherein said first operative state (B1) is a production state of a part of the plant, wherein said operative states (B1, B2) are selected from a group of operative states which have an operating time of the plant, a production time, which is formed from the working time minus the planned stoppage times, an overall time, which in turn is formed from the production time minus possible external malfunctions and an actual operating time in which production actually takes place and which in turn is formed from the production time minus actual internal malfunctions of the plant;

a detection device which detects the resource consumption of the first resource-consuming part of the plant;

an allocation device which allocates to said first operative state (B1) a first resource consumption (V1) characteristic of said first operative state (B1) and which allocates to said second operative state (B2) a second resource consumption (V2) characteristic of said second operative state (B2); and a computerized processor device in communication with the detection device and the allocation device, wherein the computerized processor device determines a value characteristic of the resource efficiency of the part of the plant whilst taking into consideration said first resource consumption (V1) and said second resource consumption (V2) and wherein the value characteristic of the resource efficiency of the part of the plant is determined by at least one quotient formation, according to the following time allocation formula:

$$B2=B1+L$$

wherein B1 and B2 are as represented above, and L represents downtime, wherein the resource is selected from a plurality of actual resources selected from the group consisting of electrical energy, heat, media for the treatment of the containers, compressed air, operating costs, and personnel costs, wherein the resource to be determined is not the actual product or the constituents thereof, wherein the values are stored in the memory device at pre-set intervals and the storage of the measurement values and the determination of the resource consumption is carried out in an ongoing operation of the plant or the part of the plant, and wherein by using one or more indicators formed, statements are made on the qualitative and quantitative degree of utilization of the respective resource or production plant, and the resource consumption is determined by measurements with measuring instruments and only parts of the plant are provided with measuring instruments which have a particularly high resource consumption or the resource consumption which differs to a pronounced degree in a manner dependent upon the respective operative states and the consumption of the remaining parts of the plant can be determined by way of the overall consumption, wherein all the particular parts of the plant involved in the value-adding process are taken into consideration in the measurement, and wherein the characteristic value for the resource efficiency is an indicator which describes the resource efficiency, including the energy efficiency of this system, wherein this indicator is formed for each type of energy and for each type of resource or each medium respectively; and wherein the plant includes a blow moulding machine, and the resource efficiency is determined with respect to the electrical energy and blow moulding air used.

7. The plant according to claim 6, wherein the plant has a second part of the plant which is capable of being operated for a time in a first operative state (B1) and which is capable of being operated for a time in a second operative state (B2), wherein said first operative state (B1) and said second operative state (B2) differ at least with respect to the resource consumption, and wherein said second operative state (B2) is a production state of the part of the plant.

8. The plant according to claim 6, wherein the plant has at least one memory device for storing at least one value which is characteristic of at least one resource consumption.

9. The plant according to claim 8, wherein the first part of the plant carries out a specified process step during the production of containers filled with liquids.

10. The method according to claim 1, wherein said first and second resource consumptions (V1, V2) and/or data or measurement values, which are characteristic thereof, are stored at least for a time and/or at least in part in a non-transitory memory device.

11. The method according to claim 1, wherein said first and second respective resource consumptions (V1, V2) or measurement values, characteristic thereof, are measured and stored in a continuous manner.

12. The method according to claim 1, wherein said first and second resource consumptions (V1, V2) are determined by measurement with at least one of: measuring instruments; by detection by a computer; and by statistical simulation.

13. The method according to claim 1, wherein said first and second resource consumptions (V1, V2) differ in said first and second operative states (B1, B2).

14. The method according to claim 1, wherein the time periods of said first and second operative states (B1, B2) are measured.

15. The method according to claim 1, wherein the detection device is measurement sensor which determines the consumption of a medium or an energy parameter.

* * * * *